United States Patent
Ji et al.

(10) Patent No.: US 8,611,743 B2
(45) Date of Patent: Dec. 17, 2013

(54) OPTICAL-LAYER TRAFFIC GROOMING IN FLEXIBLE OPTICAL NETWORKS

(75) Inventors: Philip N. Ji, Princeton, NJ (US); Dayou Qian, Princeton, NJ (US); Ankitkumar N. Patel, E. Brunswick, NJ (US); Ting Wang, Princeton, NJ (US); Yoshiaki Aono, Chiba (JP)

(73) Assignee: NEC Laboratories America, Inc., Princeton, NJ (US)

( * ) Notice: Subject to any disclaimer, the term of this patent is extended or adjusted under 35 U.S.C. 154(b) by 75 days.

(21) Appl. No.: 13/311,686

(22) Filed: Dec. 6, 2011

(65) Prior Publication Data

US 2012/0213517 A1    Aug. 23, 2012

Related U.S. Application Data

(60) Provisional application No. 61/445,135, filed on Feb. 22, 2011.

(51) Int. Cl.
*H04J 14/00* (2006.01)
*H04J 14/02* (2006.01)

(52) U.S. Cl.
USPC ............. 398/51; 398/45; 398/48; 398/50; 398/76; 398/83

(58) Field of Classification Search
None
See application file for complete search history.

(56) References Cited

U.S. PATENT DOCUMENTS

| | | | |
|---|---|---|---|
| 2002/0135835 A1 | 9/2002 | Lauder et al. | |
| 2004/0096219 A1 | 5/2004 | Abbas et al. | |
| 2009/0226169 A1* | 9/2009 | Wei et al. | 398/51 |
| 2010/0021168 A1 | 1/2010 | Huang et al. | |
| 2011/0052201 A1 | 3/2011 | Ji et al. | |
| 2011/0286746 A1* | 11/2011 | Ji et al. | 398/83 |

OTHER PUBLICATIONS

Balasubramanian et al., "On Traffic Grooming Choices for IP over WDM networks", Proceedings of IEEE Broadnets, Oct. 2006. (10 pages).
Leuthold et al., "An All-Optical Grooming Switch with Regenerative Capabilities", Proceedings of ICTON, Jun. 2009. (4 pages).
Uscumlic et al., "Traffic Grooming in WDM Optical Packet Rings", IEEE Teletraffic Congress, Sep. 2009. (8 pages).

* cited by examiner

*Primary Examiner* — Shi K Li
*Assistant Examiner* — Merlin Brito Peguero
(74) *Attorney, Agent, or Firm* — Joseph Kolodka (57) ABSTRACT

Methods and systems for optical signal grooming that include providing one or more input signals, each having one or more modulated subcarriers, to a grooming processor; and grooming the input signals at a subcarrier level with the grooming processor to produce one or more output signals by arranging the modulated subcarriers in the output signals according to a grooming operation such that the modulated subcarriers are not demodulated or decoded prior to grooming.

15 Claims, 6 Drawing Sheets

OPTICAL-LAYER TRAFFIC GROOMING IN FLEXIBLE OPTICAL NETWORKS

RELATED APPLICATION INFORMATION

This application claims priority to provisional application Ser. No. 61/445,135 filed on Feb. 22, 2011, incorporated herein by reference.

BACKGROUND

1. Technical Field

The present invention relates to optical wavelength division multiplexing networks and, more particularly, to grooming for flexible wavelength division multiplexing networks on the optical layer.

2. Description of the Related Art

The global communication network is facing increasing demands for higher capacity, and the traffic is becoming more dynamic. As the backbone for many such networks, optical wavelength division multiplexing (WDM) networks are facing challenges to improve capacity and increase flexibility. One challenge is how to improve the spectral efficiency in the dynamic network (e.g., transmitting more data within a certain optical bandwidth) with time-varying, non-uniform traffic patterns. To tackle this challenge, network resources (such as the spectral bandwidth) need to be better utilized and shared among multiple entities that need them. By sharing these resources, the resource cost is amortized over the number of users.

A common method to solve this problem is electronic traffic grooming. A feature that is fundamental to grooming is the ability to switch low speed traffic streams into high speed bandwidth trunks, the general objective of grooming is to help decompose hard circuit provisioning problems into small, simpler ones and yield an increased solution space for such problems Conventionally, traffic grooming is performed by converting the input optical signals to electrical signals, using an electrical grooming fabric capable of TDM circuit switching or packet switching to perform the grooming operation, and converting the groomed electrical signals back to optical signals. Since such a grooming operation takes place between the WDM layer and the client layers and is called electronic grooming. Electronic grooming is not cost-effective or power-efficient due to the requirement of client processing at each node.

SUMMARY

A method for signal grooming is shown that includes providing one or more input signals, each having one or more modulated subcarriers, to a grooming processor; and grooming the input signals at a subcarrier level with the grooming processor to produce one or more output signals by arranging the modulated subcarriers in the output signals according to a grooming operation such that the modulated subcarriers are not demodulated or decoded prior to grooming.

A signal grooming system is shown that includes one or more receivers, each configured to receive an input signal having one or more modulated subcarriers; a grooming processor configured to arrange the modulated input subcarriers at the subcarrier level into one or more modulated output subcarriers according to a grooming operation such that the modulated subcarriers are not demodulated or decoded prior to grooming; and one or more transmitters, each configured to transmit an output signal having one or more of said modulated output subcarriers.

A reconfigurable add-drop multiplexer node is shown that includes one or more reconfigurable optical add/drop multiplexer subsystems, each configured to accept an input signal and to pass said input signal to each other ROADM subsystem for retransmission; an add/drop aggregator configured to receive the input signals from each of the ROADM subsystems and to control adding and dropping operations on the input signals; and a grooming subsystem. The grooming subsystem includes one or more receivers, each configured to receive an input signal having one or more modulated subcarriers; a grooming processor configured to arrange the modulated input subcarriers at the subcarrier level into one or more modulated output subcarriers according to a grooming operation such that the modulated subcarriers are not demodulated or decoded prior to grooming; and one or more transmitters, each configured to transmit an output signal having one or more of said modulated output subcarriers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
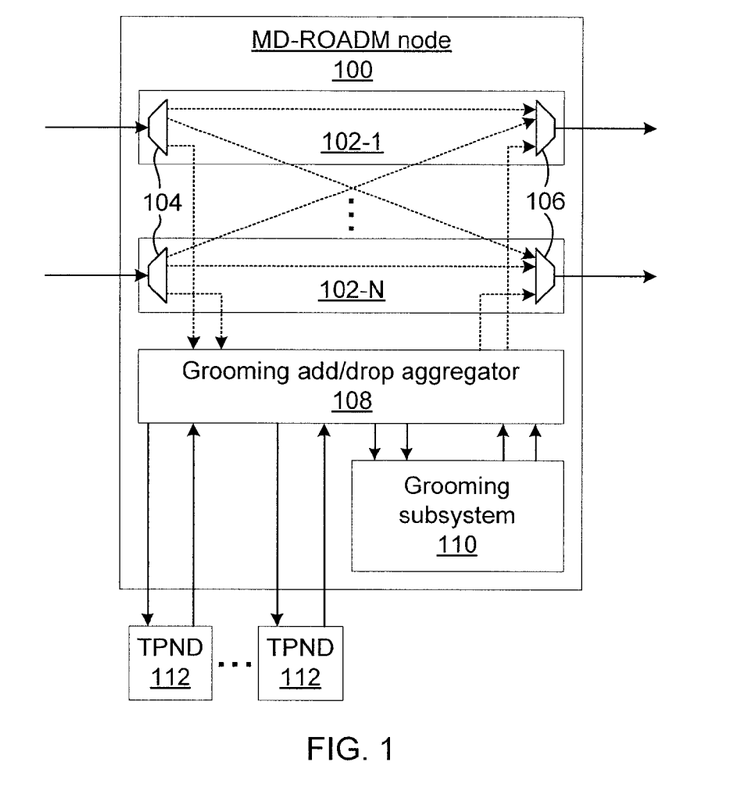
FIG. 1 is a diagram of an exemplary optical grooming node according to the present principles.

Referring now in detail to the figures in which like numerals represent the same or similar elements and initially to FIG. 1, an exemplary optical grooming node 100 is shown. In an optical network, grooming is usually performed at either the source/destination node or at an intermediate switching node. The node 100 is shown as a multi-degree reconfigurable optical add/drop multiplexer (MD-ROADM) with grooming capability. The MD-ROADM may be implemented in, for example, an orthogonal frequency division multiplexing (OFDM) network. Advantages of OFDM include not requiring a guard band between subcarriers due to orthogonality between subcarriers, little guard band between wave division multiplexing (WDM) channels, and tolerance of chromatic dispersion and polarization mode dispersion.

The grooming MD-ROADM node 100 includes three optical subsystems with fiber connections between them. The MD-ROADM node 100 includes N reconfigurable optical add/drop multiplexer (ROADM) subsystems 102. There is one ROADM subsystem 102 for each degree (i.e., each input port). The ROADM subsystems 102 each include a wavelength selective switch (WSS) 104 that separates an input WDM signal, either flexible grid or fixed grid, into different groups for different destinations. Destinations may include cross-connection to another ROADM subsystem 102, a local drop, or grooming 108/110. ROADM subsystems 102 further include a WSS 106 to collect signals from other ROADM subsystems 102 and from grooming subsystem 108/110. The role of the WSSes 104 and 106 may alternatively be filled by optical couplers and splitters respectively.

The MD-ROADM node 100 further includes grooming/add/drop aggregator (GADA) 108. The GADA 108 receives locally processed channels from all degrees 102-1 through 102-N, selects appropriate channels to be dropped at respective transponders 112, sends appropriate channels to the grooming subsystem 110 for grooming, and sends the added channels from the transponders 112 and the groomed channels to the respective output ports of ROADM subsystems 102. There are a variety of possible optical configurations that may perform channel selection, and colorless, directionless, and contentionless functioning may be implemented. Each node MD-ROADM node 100 may have one GADA 108 to share among all of the degrees 102 or may have multiple GADAs 108.

The MD-ROADM node 100 further includes grooming subsystem 110. The grooming subsystem 110 may perform a variety of grooming operations, as will be described in detail below. The grooming subsystem 110 may optionally be implemented as a separable module that may be introduced to an existing ROADM node to couple to an add/drop aggregator 108, thereby extending the functionality of the node and enabling grooming operations. The present principles allow for grooming at the subcarrier level, such that subcarriers may be groomed directly without first converting demodulating and decoding the signals to extract their contents. This advantageously allows for significant simplifications in grooming module design.

Embodiments described herein may be entirely hardware, entirely software, or include both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
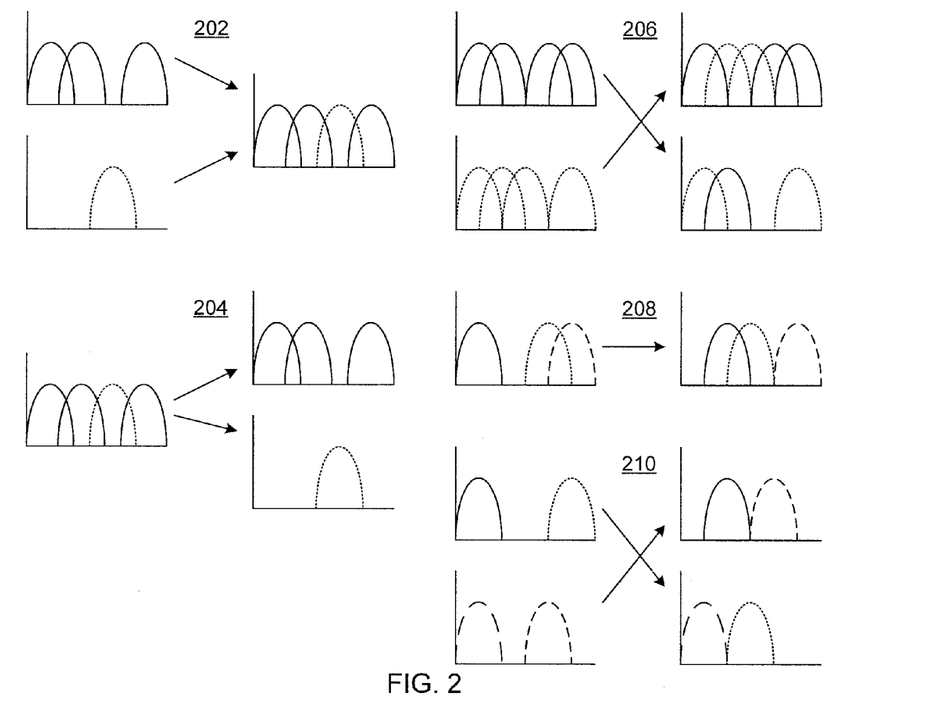
FIG. 2 is a diagram showing five illustrative grooming operations.

Referring now to FIG. 2, five illustrative grooming operations are illustrated. A combination operation 202 shows the combination of OFDM subcarriers from multiple inputs into a common groomed output. The spectral positions of the subcarriers are not changed in this operation. A separation operation 204 shows separation of OFDM subcarriers from a common input to multiple outputs. The spectral positions of the subcarriers remain unchanged in a simple separation. A crossing operation 206 exchanges part or all of the subcarriers among multiple inputs to form new OFDM output signals. Crossing operation 206 also maintains the spectral positions of the subcarriers. Shifting operation 208 shifts the spectral position of one or more subcarriers within an OFDM signal to form a new OFDM signal. A switching operation 210 is a combination of crossing operation 206 and shifting operation 208, where each subcarrier in the multiple input OFDM signals can have a spectral position shift and/or be switched to other output signals. Each of the operations in FIG. 2 has a horizontal graph that represents frequency for the baseband OFDM signal, while the vertical axis represents power level. For combination 202, separation 204, crossing 206, and switching 210 operations, an arbitrary number of inputs/outputs may be implemented. It should be recognized that this is not intended to be an exhaustive list of grooming operations—additional grooming operations may be implemented by those having ordinary skill in the art according to the present principles.

At source nodes in a network, only the combination operation 202 is needed, and it can be easily processed before the OFDM signal is generated. At destination nodes in a network, only the separation operation 204 is needed. For intermediate nodes, such as MD-ROADM node 100, all five grooming operations are possible.

Figure 3:
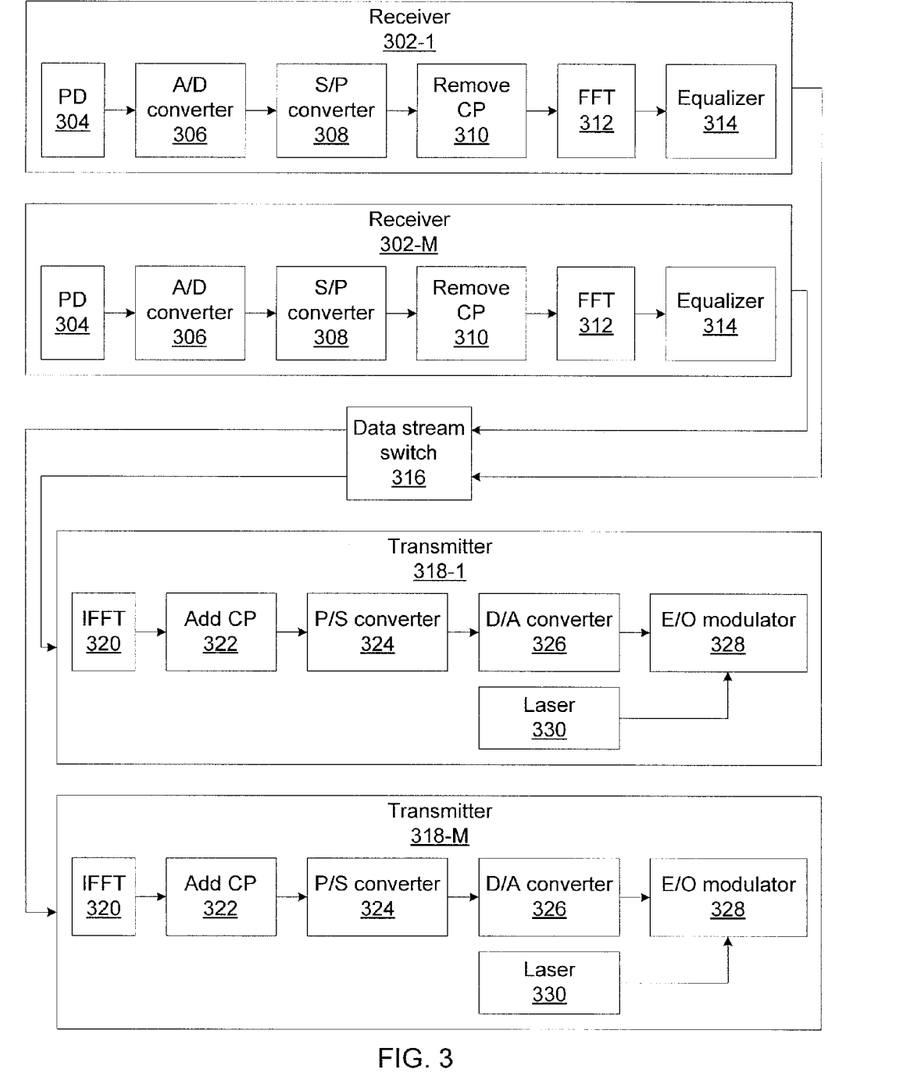
FIG. 3 is a diagram of an exemplary grooming subsystem according to the present principles.

Referring now to FIG. 3, the grooming subsystem 110 is shown in greater detail. A set of M receivers 302 accepts optical signals and converts the optical signal to the electrical domain. The receivers 302 pass the signals to data stream switch 316, which performs a grooming operation as shown above in FIG. 2. The data stream switch 316 outputs groomed signals to a set of M transmitters 318, which convert the groomed signals to optical signals and retransmit them. In the context of MD-ROADM node 100 discussed above, the receivers 302 receive optical signals from GADA 108, and the transmitters 318 transmit groomed optical signals back to GADA 108. It should be noted that the number of receivers 302 and transmitters 318 is not limited to two respectively, but may generally be any combination of receivers 302 and transmitters.

The receivers 302 receive optical signals at photodetector 302, which converts the optical signals into analog electrical signals. The electrical signals may optionally be down-converted from a radio frequency to a baseband frequency. An analog-to-digital converter (ADC) 304 converts the analog signals from the photodetector 302 into digital signals. A serial-to-parallel converter 308 converts the single digital signal into a plurality of signals, effectively de-interleaving the signal. Block 310 removes a cyclic prefix from the signals, and block 312 performs a fast Fourier transform to decompose the input signal into its component frequencies. An equalizer 314 equalizes the signals to compensate for interference or other transmission defects. It should be noted that, contrary to conventional grooming systems, no demodulator is needed to combine different data streams into a single stream, and no processor is used to perform de-interleaving or decoding. The output of a receiver 302 is a group of data streams, each including the information on one OFDM subcarrier. It should be noted that this does not mean that multiple parallel physical wiring lanes are needed to carry these data streams, as the streams can still be processed as a data group on electronic circuitry.

The subcarrier data streams output by receivers 302 are sent to a grooming processor in the form of a data stream switch 316. The data stream switch 316 differs from conventional grooming processors in that it performs grooming at the subcarrier level and does not perform processing at the client level (such as packet-level for Ethernet systems or frame-level for synchronous optical networking systems), so it is not an Ethernet router or time division multiplexing switch. Instead, the data stream switch is a simple electrical switch that switches data streams, each carrying the data from an OFDM subcarrier, to the respective new target subcarrier locations, thereby achieving grooming. To reduce the dimension of such a switch 316, multiple OFDM subcarriers can be processed as a group. Because this switching operation is used only when the network traffic grooming configuration is changed, the switching speed need not be as fast as a packet router or time division multiplexing switch. And, because switching does not require a great deal of processing, because for example processing of source and destination addresses is not needed, and because precise time synchronization is not needed, the data stream switch 316 may be implemented using simple and low-cost components. The data stream switch 316 may be bitrate and protocol independent.

Transmitters 318 receive data streams from the data stream switch 316. The transmitter 318 performs an inverse fast Fourier transform at block 320 to combine the subcarriers into a single waveform, turning the frequency domain information into time domain data streams. Block 322 adds a cyclic prefix to reduce inter-symbol interference and inter-carrier interference. Optionally, the signal may be up-converted to a radio frequency. Block 324 converts the plural parallel signals into a single serial signal. The digital signal is converted to analog at digital-to-analog converter 326. Electro-optic modulator 328 modulates the analog electrical signal onto a beam generated by laser 330. Alternatively, electro-optic modulator 328 may employ a directly modulated laser. The electro-optic modulator 328 may be implemented as an intensity modulator, a phase modulator, an electro-absorption modulator, or any other appropriate device capable of modulating a subcarrier. The groomed beams produced by the transmitters 318 are then fed back to GADA 108.

The grooming subsystem 110 can perform arbitrary grooming operations by accepting different numbers of receivers and transmitters at the data stream switch 316. The present principles may therefore be applied to fixed grid systems as well as flexible grid systems, and may be applied to channels having differing bandwidths, differing numbers of subcarriers, and differing modulation formats.

Figure 4:
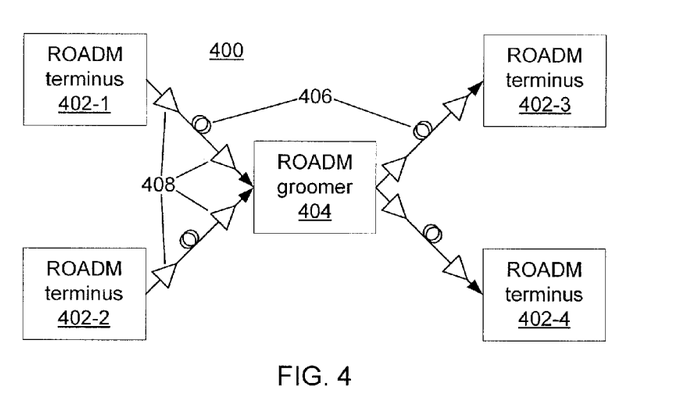
FIG. 4 is a diagram of an exemplary orthogonal frequency division multiplexing (OFDM) network according to the present principles.

Referring now to FIG. 4, an exemplary OFDM optical network 400 implementing the present principles is shown. The network 400 includes four terminal ROADM nodes 402 and one intermediate ROADM node 404 to perform grooming. In this illustrative embodiment the four ROADM terminals 402 are connected to the intermediate ROADM node 404 via 40 km of single mode fiber 406 with two optical amplifiers 408. ROADM terminals 404-1 and 404-2 each have one OFDM channel added, with each channel including 1024 OFDM subcarriers and each subcarrier having 100 Mhz of bandwidth. ROADM terminal 402-1 uses a data signal in a quadrature phase shift keyed (QPSK) modulation format, whereas ROADM terminal 402-2 uses a data signal in a 16-quadrature amplitude modulation (QAM) format. As such, the data carried by each subcarrier is 200 and 400 Mb/s respectively.

For the sake of illustration, some of the subcarriers are understood to be empty. In this example, the output of ROADM terminal 402-1 includes the band of subcarriers between 1 and 4 GHz, while the output of ROADM terminal 402-2 includes subcarriers between 4.5 and 6 GHz. The illustrative wavelengths of these two channels are 1545.32 nm and 1550.92 nm respectively. Optical grooming is performed at intermediate ROADM node 404 as described above. For example, in a combining operation, the outputs of ROADM terminals 402-1 and -2 are combined onto a single carrier beam having an exemplary wavelength of 1545.32 nm. The groomed optical channel may then be transmitted to ROADM terminal 402-3, where it is dropped at an OFDM receiver. This processing causes a degradation of roughly 3 dB due to a reduction of electrical signal power, but no other significant degradation has been observed in tests after grooming operations according to the present principles. Meanwhile, the amount of spectrum used in the link between intermediate ROADM node 404 and ROADM terminal 402-3 is nearly halved, showing that optical grooming can substantially improve spectral utilization.

Figure 5:
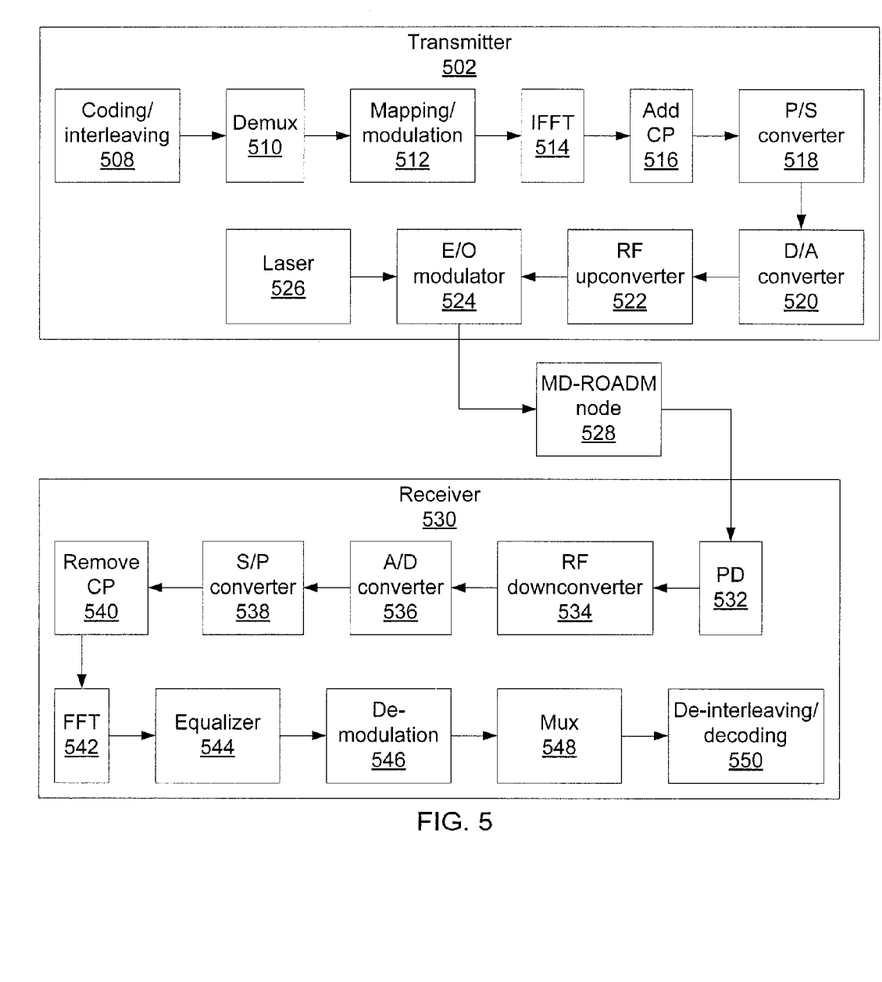
FIG. 5 is a diagram showing greater detail on the transmitters and receivers of the OFDM network according to the present principles.

Referring now to FIG. 5, greater detail is shown on the terminal ROADM nodes 402 in the network 400. As noted above, terminal ROADM nodes 402 may also perform certain grooming operations, such as combining 202 and splitting 204. A transmitter 502, which may be part of a terminal ROADM node such as 402-1, receives binary data and codes/interleaves that data into a coded bitstream at block 508. The coded bitstream 508 is subsequently demultiplexed at block 510, producing multiple data streams according to the modulation scheme employed at mapping/modulation module 512. An inverse fast Fourier transform module converts the frequency-domain data produced by mapping/modulation module 512 to produce waveforms. Block 516 adds a cyclic prefix to reduce subsequent interference, block 518 converts the parallel signals into one serial signal, and block 520 converts the digital signals into an analog signal. An optional radio frequency upconverter 522 changes the data signals to a frequency suitable for transmission. An electro-optical modulator 524 applies the data signals to a carrier beam from laser 526 and transmits the optical signals to an MD-ROADM node 528, described above in, e.g., FIG. 1.

After performing any necessary grooming, the MD-ROADM node 528 retransmits the optical signals to receiver 530. The receiver 530 converts the optical signals to the electrical domain with a photodetector 532. Block 534 performs RF downconversion on the signal, and block 536 converts the analog signals to digital signals. A serial-to-parallel converter 538 takes the analog signals and splits them into parallel signals, allowing block 340 to remove cyclic prefixes. Block 342 performs a fast Fourier transform. An equalizer 344 corrects for interference that may have accumulated during transmission, allowing demodulator 346 to convert the transmitted symbols to a data stream. A multiplexer takes the multiple signals and produces a single signal for de-interleaving/decoding block 530 to extract the transmitted data from.

Figure 6:
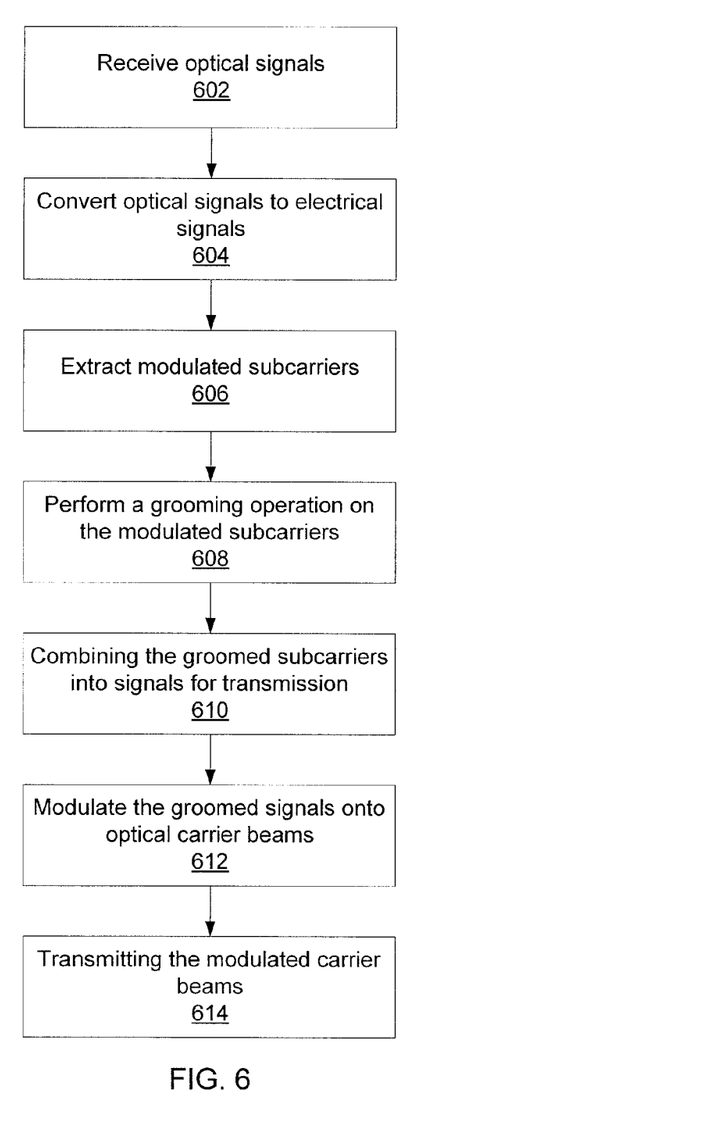
FIG. 6 is a block/flow diagram of an illustrative method for signal grooming.

Referring now to FIG. 6, a block/flow diagram of an illustrative method for signal grooming is shown. Block 602 receives signals from, e.g., an optical fiber. The signals may be optical signals that include OFDM subcarriers. Block 604 converts the optical signals to electrical signals. This may be performed using, for example, a photodiode. Block 606 extracts modulated subcarriers from the signals using, e.g., a fast Fourier transform and provides the subcarriers to a grooming processor, such that block 608 performs a grooming operation on the modulated subcarriers.

Block 610 combines the groomed subcarriers using, e.g., an inverse fast Fourier transform. Block 610 outputs one or more such signals, according to the type of grooming operation performed. This allows block 612 to modulate the signals onto, e.g., optical carrier beams, such that block 614 can transmit the signals. It should be recognized that, although the present method and systems are described in the context of optical OFDM systems, the present principles may be applied to any appropriate transmission technology including, but not limited to, electrical and wireless transmissions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for signal grooming, comprising:
providing one or more input signals, each having one or more modulated subcarriers, to an add/drop aggregator which receives locally process channels, selects channels to be dropped and sends selected channels to a grooming processor; and
grooming the input signals at a subcarrier level with the grooming processor, wherein the grooming processor includes a data stream switch that does not process at a packet level or frame level to produce one or more output signals to the add/drop aggregator by arranging the modulated subcarriers in the output signals according to a grooming operation such that the modulated subcarriers are not demodulated or decoded prior to grooming, wherein the input and output signals are optical signals and the subcarriers are orthogonal frequency division multiplexed subcarriers.

2. The method of claim 1, wherein the grooming processor is a data stream switch.

3. The method of claim 1, wherein the grooming operation includes one of a crossing operation, a shifting operation, and a switching operation.

4. The method of claim 1, wherein grooming is performed independent of modulation format.

5. The method of claim 1, wherein grooming further comprises producing one or more output signals by combining a plurality of modulated subcarriers into a single signal.

6. A signal grooming system, comprising:
one or more receivers, each configured to receive an input signal having one or more modulated subcarriers;
an add/drop aggregator which receives locally process channels, selects channels to be dropped and sends selected channels;
a grooming processor configured to arrange the modulated input subcarriers at the subcarrier level into one or more modulated output subcarriers according to a grooming operation such that the modulated subcarriers are not demodulated or decoded prior to grooming, wherein the grooming processor includes a data stream switch that does not process at a packet level or frame level to produce one or more output signals to the add/drop aggregator; and
one or more transmitters, each configured to transmit an output signal having one or more of said modulated output subcarriers, wherein the input and output signals are optical signals and the modulated subcarriers are orthogonal frequency division multiplexed subcarriers.

7. The signal grooming system of claim 6, wherein the grooming processor is a data stream switch.

8. The signal grooming system of claim 6, wherein the grooming operation includes one of a crossing operation, a shifting operation, and a switching operation.

9. The signal grooming system of claim 6, wherein the grooming processor is further configured to groom subcarriers independent of modulation format.

10. The signal grooming system of claim 6, wherein the grooming processor is further configured to producing one or more output signals by combining a plurality of modulated subcarriers into a single signal.

11. A reconfigurable add-drop multiplexer (ROADM) node, comprising:
one or more reconfigurable optical add/drop multiplexer subsystems, each configured to accept an input signal and to pass said input signal to each other ROADM subsystem for retransmission;
an add/drop aggregator configured to receive the input signals from each of the ROADM subsystems and to control adding and dropping operations on the input signals;
a grooming subsystem, comprising:
one or more receivers, each configured to receive an input signal having one or more modulated subcarriers;
an add/drop aggregator which receives locally process channels, selects channels to be dropped and sends selected channels to a grooming processor configured to arrange the modulated input subcarriers at the subcarrier level into one or more modulated output subcarriers according to a grooming operation, including a data stream switch that does not process at a packet level or frame level to produce one or more output signals to the add/drop aggregator such that the modulated subcarriers are not demodulated or decoded prior to grooming;
one or more transmitters, each configured to transmit an output signal having one or more of said modulated output subcarriers, wherein the input and output signals are optical signals and the modulated subcarriers are orthogonal frequency division multiplexed subcarriers.

12. The ROADM node of claim 11, wherein the grooming processor is a data stream switch.

13. The ROADM node of claim 11, wherein the grooming operation includes one of a crossing operation, a shifting operation, and a switching operation.

14. The ROADM node of claim 11, wherein the grooming processor is further configured to groom subcarriers independent of modulation format.

15. The ROADM node of claim 11, wherein the grooming processor is further configured to producing one or more output signals by combining a plurality of modulated subcarriers into a single signal.

* * * * *